(12) United States Patent
Cui et al.

(10) Patent No.: US 12,177,704 B2
(45) Date of Patent: Dec. 24, 2024

(54) CARRIER SPECIFIC SCALING FACTOR IN CELLULAR NETWORKS

(71) Applicant: Apple Inc., Cupertino, CA (US)

(72) Inventors: Jie Cui, San Jose, CA (US); Qiming Li, Beijing (CN); Dawei Zhang, Saratoga, CA (US); Hong He, San Jose, CA (US); Huaning Niu, San Jose, CA (US); Manasa Raghavan, Sunnyvale, CA (US); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 517 days.

(21) Appl. No.: 17/439,908

(22) PCT Filed: May 6, 2021

(86) PCT No.: PCT/CN2021/091861
§ 371 (c)(1),
(2) Date: Sep. 16, 2021

(87) PCT Pub. No.: WO2022/232979
PCT Pub. Date: Nov. 10, 2022

(65) Prior Publication Data
US 2023/0209382 A1 Jun. 29, 2023

(51) Int. Cl.
*H04W 4/00* (2018.01)
*H04W 24/10* (2009.01)
*H04W 76/16* (2018.01)
*H04B 7/06* (2006.01)

(52) U.S. Cl.
CPC ........... *H04W 24/10* (2013.01); *H04W 76/16* (2018.02); *H04B 7/0626* (2013.01)

(58) Field of Classification Search
USPC ................ 370/252, 393, 395, 300, 333, 338
See application file for complete search history.

(56) References Cited

U.S. PATENT DOCUMENTS

2019/0253906 A1   8/2019   Lin
2022/0038927 A1*  2/2022   Manolakos ........... H04L 5/0078

FOREIGN PATENT DOCUMENTS

CN   107852311       3/2018
WO   2020069268      4/2020
WO   2020202396 A1  10/2020

OTHER PUBLICATIONS

Inter-Frequency Measurement Requirement Without Gap, 3GPP TSG-RAN WG4 Meeting #92bis, R4-1910819, Oct. 18, 2019, 3 pages (Year: 2019).*
Discussion on CSI-RS Based L3 Measurement Requirements, TSG-RAN WG4 Meeting #94-e-Bis, R4-2004292, Apr. 30, 2020, 5 pages (Year: 2020).*
CR on CSSF Definition for CSI-RS Based Measurement, Huawei et al., 3GPP TSG-RAN4 Meeting #97-e, R4-2015491, Nov. 13, 2020, 22 pages.

(Continued)

*Primary Examiner* — Zewdu A Beyen
(74) *Attorney, Agent, or Firm* — Kilpatrick Townsend & Stockton LLP

(57) ABSTRACT

The present application relates to devices and components including apparatus, systems, and methods for carrier-specific scaling factor for measurements with or without measurement gaps.

20 Claims, 11 Drawing Sheets

(56) References Cited

OTHER PUBLICATIONS

International Patent Application No. PCT/CN2021/091861, International Search Report and Written Opinion, Mailed on Jan. 26, 2022, 9 pages.
CR on CSSF with both CSI-RS and SSB, Apple Inc., 3GPP TSG-RAN4 Meeting #97-e, R4-2017317, Nov. 2-13, 2020, 15 pages.
3rd Generation Partnership Project; Technical Specification Group Radio Access Network; Technical Specification Group Radio Access Network; Evolved Universal Terrestrial Radio Access (E-UTRA); Requirements for support of radio resource management (Release 17), 3GPP TS 36.133 V17.1.0, Mar. 2021, 3887 pages.
3rd Generation Partnership Project; Technical Specification Group Radio Access Network; Technical Specification Group Radio Access Network; NR; Requirements for support of radio resource management (Release 17), 3GPP TS 38.133 V17.1.0, Mar. 2021, 2173 pages.
International Patent Application No. PCT/CN2021/091861, International Preliminary Report on Patentability, Nov. 16, 2023, 5 pages.
Japan Patent Application No. 2023-566719, Office Action, Oct. 18, 2024, 8 pages.

\* cited by examiner

CSSSF$_{outside\_gap,i}$ scaling factor for EN-DC mode

| Scenario | CSSF$_{outside\_gap,i}$ for FR1 PSCC | CSSF$_{outside\_gap,i}$ for FR1 SCC | CSSF$_{outside\_gap,i}$ for FR2 PSCC | CSSF$_{outside\_gap,i}$ for FR2 SCC where neighbor cell measurement is required | CSSF$_{outside\_gap,i}$ for FR2 SCC where neighbor cell measurement is not required | CSSF$_{outside\_gap,i}$ for inter-frequency MO with no MG |
|---|---|---|---|---|---|---|
| EN-DC w/ FR2 only inter-band CA | N/A | N/A | $1 + N_{PSCC\_CSIRS}$ | If condition A is false: $2 \times (1 + N_{SCC\_CSIRS\_FR2\_NCM})$<br><br>If condition A is true: $(1 + N_{SCC\_CSIRS\_FR2\_NCM})$ | $2 \times (N_{SCC\_SSB} + Y + 2 \times N_{SCC\_CSIRS} - 1 - N_{SCC\_CSIRS\_NCM})$ | $2 \times (N_{SCC\_SSB} + Y + 2 \times N_{SCC\_CSIRS} - 1 - N_{SCC\_CSIRS\_NCM})$ |
| EN-DC w/ FR1 + FR2 CA (FR1 PSCell) | $1 + N_{PSCC\_CSIRS}$ | $2 \times (N_{SCC\_SSB} + Y + 2 \times N_{SCC\_CSIRS} - 1 - N_{SCC\_CSIRS\_NCM})$ | N/A | If condition A is false: $2 \times (1 + N_{PSCC\_CSIRS\_FR2\_NCM})$<br><br>If condition A is true: $(1 + N_{PSCC\_CSIRS\_FR2\_NCM})$ | $2 \times (N_{SCC\_SSB} + Y + 2 \times N_{SCC\_CSIRS} - 1 - N_{SCC\_CSIRS\_NCM})$ | $2 \times (N_{SCC\_SSB} + Y + 2 \times N_{SCC\_CSIRS} - 1 - N_{SCC\_CSIRS\_NCM})$ |

Figure 3

CSSSF$_{outside\_gap,i}$ scaling factor for SA mode

| Scenario | CSSF$_{outside\_gap,i}$ for FR1 PCC | CSSF$_{outside\_gap,i}$ for FR1 SCC | CSSF$_{outside\_gap,i}$ for FR2 PCC | CSSF$_{outside\_gap,i}$ for FR2 SCC where neighbor cell measurement is required | CSSF$_{outside\_gap,i}$ for FR2 SCC where neighbor cell measurement is not required | CSSF$_{outside\_gap,i}$ for inter-frequency MO with no MG |
|---|---|---|---|---|---|---|
| FR2 only interband CA | N/A | N/A | 1 | If condition A is false: 2 x (1 + N$_{SCC\_CSIRS\_FR2\_NCM}$) If condition A is true: (1 + N$_{SCC\_CSIRS\_FR2\_NCM}$) | 2 x (N$_{SCC\_SSB}$ + Y + 2 x N$_{SCC\_CSIRS}$ - 1 - N$_{SCC\_CSIRS\_NCM}$) | 2 x (N$_{SCC\_SSB}$ + Y + 2 x N$_{SCC\_CSIRS}$ - 1 - N$_{SCC\_CSIRS\_NCM}$) |
| FR1 + FR2 CA (FR1 PCell) | 1 + N$_{PCC\_CSIRS}$ | 2 x (N$_{SCC\_SSB}$ + Y + 2 x N$_{SCC\_CSIRS}$ - 1 - N$_{SCC\_CSIRS\_NCM}$) | N/A | If condition A is false: 2 x (1 + N$_{PSCC\_CSIRS\_FR2\_NCM}$) If condition A is true: (1 + N$_{PSCC\_CSIRS\_FR2\_NCM}$) | 2 x (N$_{SCC\_SSB}$ + Y + 2 x N$_{SCC\_CSIRS}$ - 1 - N$_{SCC\_CSIRS\_NCM}$) | 2 x (N$_{SCC\_SSB}$ + Y + 2 x N$_{SCC\_CSIRS}$ - 1 - N$_{SCC\_CSIRS\_NCM}$) |

Figure 4

$CSSF_{outside\_gap,i}$ scaling factor for NR-DC mode

| Scenario | $CSSF_{outside\_gap,i}$ for FR1 PCC | $CSSF_{outside\_gap,i}$ for FR1 SCC | $CSSF_{outside\_gap,i}$ for FR2 PSCC | $CSSF_{outside\_gap,i}$ for FR2 SCC where neighbor cell measurement is not required | $CSSF_{outside\_gap,i}$ for inter-frequency MO with no MG |
|---|---|---|---|---|---|
| FR1 + FR2 NR DC (FR1 PCell and FR2 PSCell) | $1 + N_{PCC\_CSIRS}$ | $2 \times (N_{SCC\_SSB} + Y + 2 \times N_{SCC\_CSIRS})$ | If condition B is false: $2 \times (1 + N_{PSCC\_CSIRS})$ If condition B is true: $(1 + N_{PSCC\_CSIRS})$ | $2 \times (N_{SCC\_SSB} + Y + 2 \times N_{SCC\_CSIRS} - 1 - N_{SCC\_CSIRS\_NCM})$ | $2 \times (N_{SCC\_SSB} + Y + 2 \times N_{SCC\_CSIRS} - 1 - N_{SCC\_CSIRS\_NCM})$ |

Figure 5

| Scenario | CSSSF$_{outside\_gap,i}$ for FR1 PCC | CSSF$_{outside\_gap,i}$ for FR1 SCC | CSSF$_{outside\_gap,i}$ for FR2 PCC | CSSF$_{outside\_gap,i}$ for FR2 SCC where neighbor cell measurement is required | CSSF$_{outside\_gap,i}$ for FR2 SCC where neighbor cell measurement is not required | CSSF$_{outside\_gap,i}$ for inter-frequency MO with no MG |
|---|---|---|---|---|---|---|
| NE-DC with FR2 only interband CA | N/A | N/A | $1 + N_{PCC\_CSIRS}$ | If condition A is false: $2 \times (1 + N_{SCC\_CSIRS\_FR2\_NCM})$ <br> If condition A is true: $(1 + N_{SCC\_CSIRS\_FR2\_NCM})$ | $2 \times (N_{SCC\_SSB} + Y + 2 \times N_{SCC\_CSIRS} - 1 - N_{SCC\_CSIRS\_NCM})$ | $2 \times (N_{SCC\_SSB} + Y + 2 \times N_{SCC\_CSIRS} - 1 - N_{SCC\_CSIRS\_NCM})$ |
| NE-DC WITH FR1 + FR2 CA (FR1 PCell) | $1 + N_{PCC\_CSIRS}$ | $2 \times (N_{SCC\_SSB} + Y + 2 \times N_{SCC\_CSIRS} - 1 - N_{SCC\_CSIRS\_NCM})$ | N/A | If condition A is false: $2 \times (1 + N_{PSCC\_CSIRS\_FR2\_NCM})$ <br> If condition A is true: $(1 + N_{SCC\_CSIRS\_FR2\_NCM})$ | $2 \times (N_{SCC\_SSB} + Y + 2 \times N_{SCC\_CSIRS} - 1 - N_{SCC\_CSIRS\_NCM})$ | $2 \times (N_{SCC\_SSB} + Y + 2 \times N_{SCC\_CSIRS} - 1 - N_{SCC\_CSIRS\_NCM})$ |

CSSSF$_{outside\_gap,i}$ scaling factor for NE-DC mode

CARRIER SPECIFIC SCALING FACTOR IN CELLULAR NETWORKS

CROSS-REFERENCES TO RELATED APPLICATIONS

This application is the U.S. National Phase application of International Application No. PCT/CN2021/091861, filed May 6, 2021, the contents of which is hereby incorporated by reference in its entirety for all purposes.

BACKGROUND

Third Generation Partnership Project (3GPP) Technical Specifications (TSs) define standards for wireless networks. These TSs includes numerous details relating to dual connectivity (DC) in which a user equipment (UE) may be provided radio resources from a plurality of base stations. These TSs also include details relating to carrier aggregation (CA) operation in which a UE may be provided resources by a plurality of component carriers.

BRIEF DESCRIPTION OF THE DRAWINGS

FIG. 3 illustrates a table describing carrier-specific scaling factor (CSSF) calculations in accordance with some embodiments.

FIG. 4 illustrates another table describing CSSF calculations in accordance with some embodiments.

FIG. 5 illustrates another table describing CSSF calculations in accordance with some embodiments.

FIG. 6 illustrates another table describing CSSF calculations in accordance with some embodiments.

DETAILED DESCRIPTION

Figure 1:
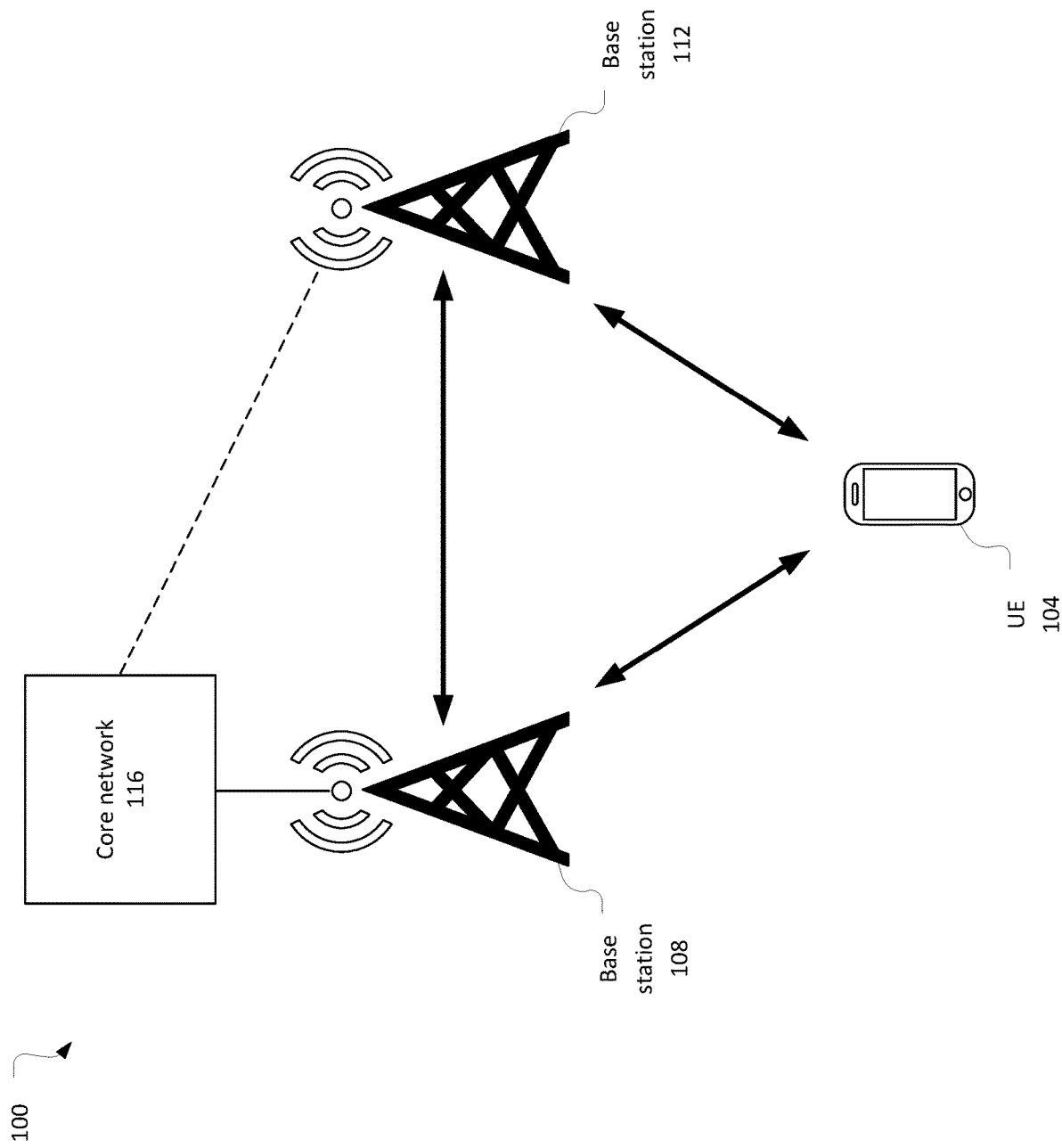
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or digital signal processor (DSP) that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, or network interface cards.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware element(s). A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 communicatively coupled with one or more base stations such as, for example, base station 108 and base station 112. The UE 104 and the base stations may communicate over air interfaces compatible with 3GPP TSs such as those that define Long Term Evolution (LTE) and Fifth Generation (5G) new radio (NR) system standards. The base stations 108/112 may include an evolved node B (eNB) to provide one or more LTE evolved universal terrestrial radio access (E-UTRA) cells to provide E-UTRA user plane and control plane protocol terminations toward the UE 104. The base stations 108/112 may include a next generation node B (gNB) to provide one or more 5G NR cells to provide NR user plane and control plane protocol terminations toward the UE 104.

The network environment 100 may support dual connectivity (DC) operation in which the UE 104 may be configured to utilize radio resources provided by distinct schedulers located in the base station 108/112. If the base stations 108/112 provide serving cells with different radio access technologies (RATs), for example, E-UTRA and NR cells, the DC operation may be referred to as a multi-RAT DC or multi-radio DC (MR DC). The base stations may be coupled with each other via an X2 interface over an ideal or non-ideal backhaul.

One of the base stations may be configured as a master node (MN) to provide a control plane connection to the core network 116. The MN may be associated with the group of serving cells referred to as a master cell group (MCG), which includes a primary cell (SpCell) and optionally one or more secondary cells (SCells) in a carrier aggregation (CA) deployment. The SpCell of the MCG may also be referred to as a primary serving cell (PCell). For purposes of some embodiments of the present description, the base station 108 may be considered the MN and may also be referred to, simply, as MN 108.

The other base station may be configured as a secondary node (SN), which may not have a control plane connection to the core network 116. The SN may be used to provide additional resources to the UE 104. The SN may be associated with a group of serving cells referred to as a secondary cell group (SCG), which includes an SpCell and one or more SCells in a CA deployment. The SpCell of the SCG may also be referred to as a primary secondary serving cell (PSCell). For purposes of the present description, the base station 112 may be considered the SN and may also be referred to, simply, as SN 112.

If the MN 108 is an eNB and the SN 112 is a gNB, the UE 104 may be operating in an E-UTRA-NR (EN)-DC mode. If the MN 108 is a gNB and the SN 112 is an eNB, the UE 104 may be operating in an NR-EUTRA (NE)-DC mode. If the MN 108 is a gNB and the SN 112 is a gNB, the UE 104 may be operating in an NR-DC mode.

In some embodiments, only one base station may provide coverage for the UE 104. If the base station is a gNB, this may be referred to as a standalone (SA) mode. The gNB in the SA mode may provide services through a PCell and, optionally, one or more SCells.

The cells provided by the base stations 108/112 may be in a frequency range 1 (FR1), corresponding to frequency range 410 MHz-7125 MHz; frequency range 2 (FR2) corresponding to frequency range 24,250 MHz-52,600 MHz; or a higher frequency range (FRH) corresponding to a frequency range above 52,600 MHz, for example, 52,600 MHz to 71,000 MHz.

In a DC mode, at least the MN 108 may be coupled with the core network 116 via an S1 interface. In some embodiments, the SN 112 may also be coupled with the core network 116. In some embodiments, the core network 116 may be an evolved packet core (EPC) or a 5G core network (5GC).

The base stations 108/112 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The UE 104 may include two MAC entities to enable communication with the MCG and SCG.

In some embodiments, the base stations 108/112 may configure measurement objects (MOs) to the UE 104. An MO may identify time and frequency location of synchronization signal and physical broadcast channel blocks (SSBs) and channel state information-reference signal (CSI-RS) resources to be measured.

In some embodiments, the MOs may include NR MOs that identify SSBs/CSI-RS resources within the NR cells. These MOs may include intra-RAT MOs and inter-RAT MOs. An intra-RAT MO may configure intra-RAT measurements, which may include inter-frequency and intra-frequency measurements. For example, a gNB may provide the UE 104 with an intra-RAT MO to configure the UE 104 to measure an NR frequency layer. An inter-RAT MO may configure inter-RAT measurements. For example, an eNB may provide the UE 104 with an inter-RAT MO to configure the UE 104 to measure the NR frequency layer.

In some embodiments, the UE 104 may use a carrier specific scaling factor (CSSF) to scale measurement delay requirements, NR positioning reference signal (PRS)-based measurements, or CSI-RS based layer 3 (L3) measurements when the UE 104 is configured to monitor multiple MOs. The measurement delay requirements may be similar to those given in clauses 9.2, 9.3, and 9.4 of 3GPP TS 38.133 v17.1.0 (2021-03). The NR PRS-based measurements may be similar to those given in, for example, clause 9.9 of TS 38.133. And CSI-RS based L3 measurements may be similar to those given in, for example, clause 9.10 of 3GPP TS 38.133, which provides general requirements for the CSI-RS based L3 measurements that may serve as a basis for CSI-RS based measurement reporting in RRC_CONNECTED state. L3 measurements may be filtered, reported, and processed at an RRC layer. These measurements may serve as a basis for radio resource management (RRM) decisions (for example, handover procedures) that benefit from a relatively long-term view of channel conditions. This is in contrast to L1 measurements, performed at the PHY layer, which are useful for decisions that benefit from lower delay (for example, beam switching).

A $CSSF_{outside-gap,i}$ may be the scaling factor for measurements of measurement object i conducted outside measurement gaps. A $CSSF_{outside-gap,i}$ may be applied to intra-frequency and inter-frequency measurements with no measurement gaps.

The CSSF factors outside measurement gaps may take into account both SSB MOs and CSI-RS L3 MOs. Embodiments of the present disclosure provide updated CSSF definitions that properly accommodate for SSB/CSI-RS L3 MOs in various circumstances. Embodiments also describe updates to definitions for CSSF factors inside measurement gaps to account for CSI-RS L3 measurements.

Figure 2:
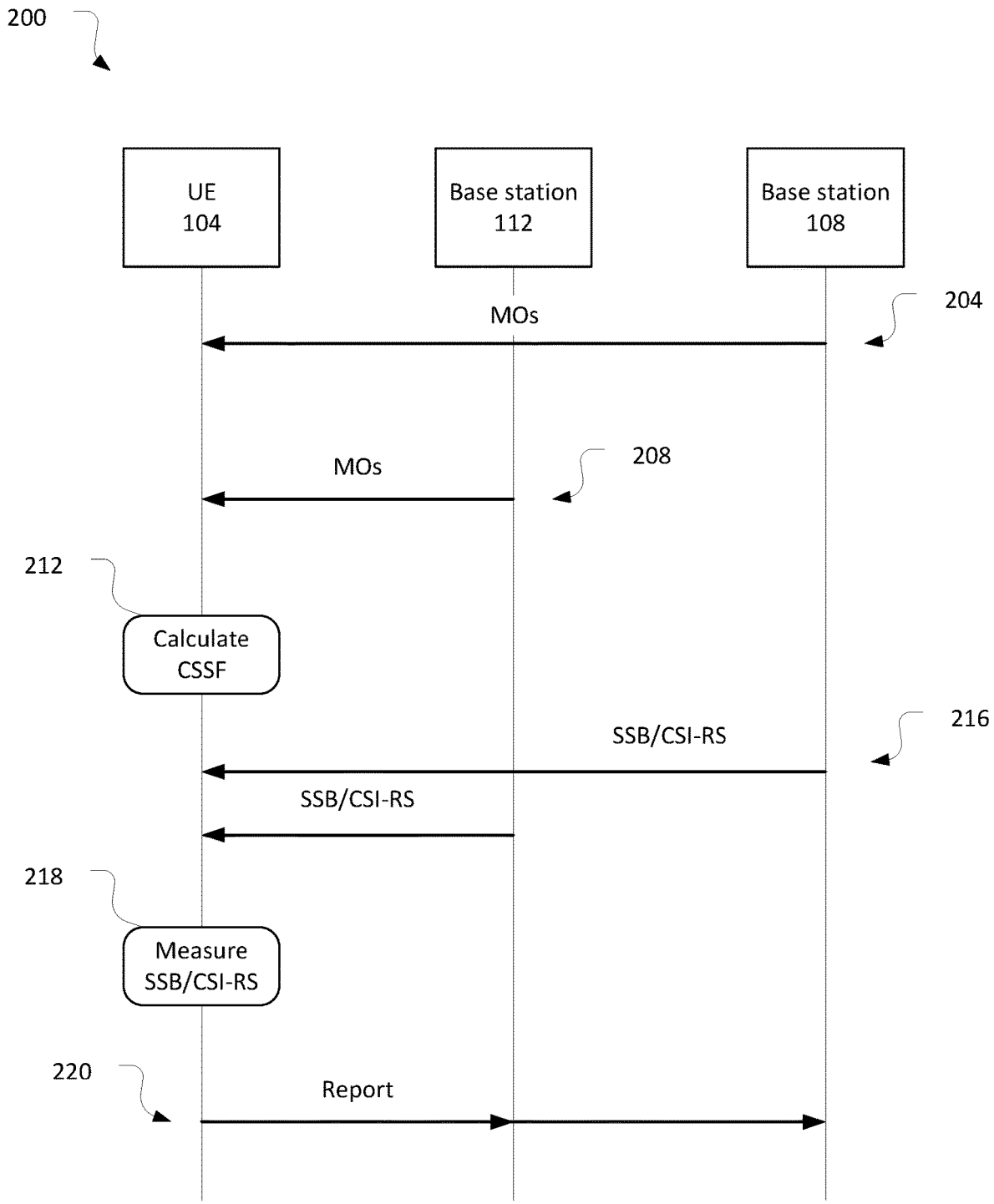
FIG. 2 illustrates a measurement procedure in accordance with some embodiments.

FIG. 2 illustrates a measurement operation 200 in accordance with some embodiments.

The measurement operation 200 may include, at 204, the base station 108 providing MOs to configure the UE 104 to measure various component carriers. The component carriers may include both a primary component carrier (PCC) that provides the PCell, one or more secondary component carriers (SCCs) that provide respective SCells; a primary secondary component carrier (PSCC) that provides a PSCell; and one or more SCCs that provide respective SCells.

The measurement operation 200 may further include, at 208, the base station 112 providing MOs to configure the UE 104 to measure various component carriers. The component carriers may include the PSCC and one or more SCCs that provide respective SCells.

At 212, the UE 104 may calculate a CSSF to use for measurements configured by the MOs outside measurement gap. The CSSF may be calculated based on whether both SSB and CSI-RS MOs are configured. The calculation may be further based on the DC mode (for example, EN-DC, standalone, NR-DC, or NE-DC) as well as the type of carrier aggregation (for example, FR2 only with inter-band CA or FR1+FR2 CA). Examples to illustrate various combinations of these factors are shown in the tables of FIG. 3-6.

The calculated CSSF may be used to facilitate sharing of one or more searchers of the UE for measurements on different component carriers. In some embodiments, the UE 104 may include a plurality of searchers that are capable of simultaneously measuring a corresponding plurality of component carriers. The searchers may correspond to radio-frequency and baseband processing resources that may be used for the measurement operations. In some embodiments, the UE 104 may include two searchers providing the UE 104 with the capability to simultaneously measure two component carriers. A first searcher may be dedicated to performing measurements on an SpCell (for example, a PCell or PSCell) while a second searcher may be dedicated to performing measurements on one or more SCells. The UE 104 may calculate the CSSFs as described with respect to Tables 300-600 described below.

At 216, base stations 108/112 may transmit SSB or CSI-RS on various component carriers.

The measurement operation 200 may further include, at 218, the UE 104 measuring the RSs transmitted by the base station 108 or 112. The measurements may be outside of measurement gaps as configured by the MOs received from the base stations 108/112. The measurements may be conducted within a measurement period determined based on the calculated CSSF.

At 220, the UE 104 may send a report to the network based on the measurement of the SSB/CSI-RS. The report may be sent to the base station 108/112. The report may be periodic, aperiodic, or event-based.

In some embodiments, the base station 108/112 may also calculate the CSSF to determine the period in which the measurements are to be made. If the report is received within the predetermined period, the measurements may be considered valid. Otherwise, the measurements may be considered invalid.

FIGS. 3-6 illustrate tables describing CSSF calculations for scenarios in various DC/SA modes in accordance with some embodiments. Unless described otherwise herein, the tables of FIGS. 3-6 may be similar to those described in clause 9.1.5.1 of 3GPP TS 38.133 v17.1.0 (2021-03).

The CSSFs may include a $CSSF_{outside\_gap,i}$ for FR1 PCC/PSCC; a $CSSF_{outside\_gap,i}$ for FR1 SCC; a $CSSF_{outside\_gap,i}$ for FR2 PSCC; a $CSSF_{outside\_gap,i}$ for FR2 SCC where neighbor cell measurement is required; a $CSSF_{outside\_gap,i}$ for FR2 SCC where neighbor cell measurement is not required; and a $CSSF_{outside\_gap,i}$ for inter-frequency MO with no measurement gap. These CSSFs will be described in further detail below upon their subsequent introduction.

FIG. 3 illustrates a table 300 describing CSSF calculations for two scenarios in EN-DC mode in accordance with some embodiments. Thus, the MN 108 is an eNB and the SN 112 is a gNB. Table 300 may be similar to Table 9.1.5.1.1-1 of 3GPP TS 38.133 with the exception of the CSSF calculations for the $CSSF_{outside\_gap,i}$ for FR2 SCC where neighbor cell measurement is required.

In the first scenario, the UE 104 may be configured for EN-DC mode with FR2 only inter-band CA. For example, the NR component carriers (for example, PSCC and SCC(s)) may be in different bands in FR2. As used herein, a frequency band may be synonymous with a frequency layer.

A first searcher of the UE 104 may be dedicated to the PCell provided by the MN eNB, and a second searcher may be shared by the PSCell and any SCells provided by the SN gNB. The PSCell may have 50% of the second searcher and the SCells may share the other 50% of the second searcher. The CSSFs may be determined for the sharing of the second searcher.

The CSSFs that may be relevant to the first scenario may include $CSSF_{outside\_gap,i}$ for FR2 PSCC, $CSSF_{outside\_gap,i}$ for FR2 SCC where neighbor cell measurement is required, $CSSF_{outside\_gap,i}$ for FR2 SCC where neighbor cell measurement is not required, and $CSSF_{outside\_gap,i}$ for inter-frequency MO with no measurement gap.

The $CSSF_{outside\_gap,i}$ for FR2 PSCC may be used to determine the measurement period for measurements on the PSCC that is in FR2. As shown, the UE 104 may calculate the $CSSF_{outside\_gap,i}$ for FR2 PSCC as $1+N_{PSCC\_CSIRS}$, where $N_{PSCC\_CSIRS}$ is '1' if the PSCC is configured with either both SSB and CSI-RS L3 MOs or only a CSI-RS based L3 MO; otherwise, $N_{PSCC\_CSIRS}$ is '0.'

The $CSSF_{outside\_gap,i}$ for FR2 SCC where neighbor cell measurement is required may be used to determine the measurement period for measurements on a particular SCC. In FR2, an SCC in which neighbor cell measurement is required may be referred to as a full-capability SCC. The full-capability SCC may be an SCC on which the UE 104 is configured to report SSB based measurements when neither the PCC nor the PSCC is in the same band. If the neighbor cell measurement is performed on the full-capability SCC, additional measurements in the same band as the full-capability SCC may not need to be measured. Thus, the full-capability SCC may be prioritized over other SCCs.

The UE 104 may determine $CSSF_{outside\_gap,i}$ for FR2 SCC where neighbor cell measurement is required based on whether a condition (condition A) is true or false. Condition A may be true when only one FR2 SCell/SCC is configured with an MO and no inter-frequency MOs without measurement gap are configured. When condition A is true, the last two columns of table 300 may be not applicable and the full-capability SCC may be provided all of the second searcher. When condition A is true, the UE 104 may determine that the $CSSF_{outside\_gap,i}$ for FR2 SCC where neighbor cell measurement (NCM) is required is $1+N_{SCC\_CSIRS\_FR2\_NCM}$, where $N_{SCC\_CSIRS\_FR2\_NCM}$ is '1' if FR2 SCC where neighbor cell measurement is required includes either both SSB and CSI-RS MOs configured or only CSI-RS MO configured; otherwise, $N_{SCC\_CSIRS\_FR2\_NCM}$ is '0.' Thus, even though the SCC has 100% of the second searcher, the measurement period may still need to be extended if the CSI-RS MO is configured as the UE 104 may need to detect/measure both the SSB and the CSI-RS.

It may be noted that even if only the CSI-RS MO is configured, without an SSB-based MO being configured, the UE 104 may still need to detect the associated SSB before the CSI-RS measurement in order to determine the timing needed to measure the CSI-RS. Thus, the relevant CSSI will be 2 to provide the UE 104 with the time needed to process both the SSB and the CSI-RS even if only the CSI-RS MO is configured.

The UE 104 may determine the condition A is false if more than one SCell/SCC is configured with an MO or an inter-frequency MO without measurement gap is configured. If condition A is false, the UE 104 may determine that the $CSSF_{outside\_gap,i}$ for FR2 SCC where neighbor cell measurement is required is $2\times(1+N_{SCC\_CSIRS\_FR2\_NCM})$. Thus, in this case, the second searcher may be shared among other MOs such as those corresponding to the last two columns of table 300.

The $CSSF_{outside\_gap,i}$ for FR2 SCC where neighbor cell measurement is not required may be used to determine the measurement period for measurements SCCs other than the full-capability SCCs. This CSSF may be set equal to $2\times(N_{SCC\_SSB}+Y+2\times N_{SCC\_CSIRS}-1-N_{SCC\_CSIRS\_NCM})$, where $N_{SCC\_SSB}$ is a number of configured SCell(s) with only SSB based L3 measurements configured; Y is a number of configured inter-frequency MOs without measurement gap that are being measured outside of a measurement gap for CA-capable UE, otherwise, Y is '0'; $N_{SCC\_CSIRS}$ is a number of configured SCell(s) with either both SSB and CSI-RS based L3 measurements configured or only CSI-RS based L3 measurement configured; and $N_{SCC\_CSIRS\_NCM}$ is the same as $N_{SCC\_CSIRS\_FR2\_NCM}$ described above.

The $CSSF_{outside\_gap,i}$ for inter-frequency MOs with no measurement gap may be used to determine the measurement period for MOs configured by a node in a first frequency layer for performing a measurement on a second frequency layer outside of measurement gap. This CSSF may be the same as the $CSSF_{outside\_gap,i}$ for FR2 SCC where neighbor cell measurement is not required discussed immediately above.

The second scenario covered by table 300 for EN-DC mode may include FR1 plus FR2 CA, with the PSCell/PSCC being in FR1 and the NR SCells/SCCs in FR1 or FR2. The CSSFs that may be relevant to the second scenario include $CSSF_{outside\_gap,i}$ for FR1 PSCC, $CSSF_{outside\_gap,i}$ for FR1 SCC, $CSSF_{outside\_gap,i}$ for FR2 SCC where neighbor cell measurement is required, $CSSF_{outside\_gap,i}$ for FR2 SCC where neighbor cell measurement is not required, and $CSSF_{outside\_gap,i}$ for inter-frequency MO with no measurement gap.

The $CSSF_{outside\_gap,i}$ for FR1 PSCC may be used to determine the measurement period for measurements on the PSCC that is in FR1. This may be similar to that described above with respect to $CSSF_{outside\_gap,i}$ for FR2 PSCC. In particular, the UE 104 may calculate the $CSSF_{outside\_gap,i}$ for FR1 PSCC as $1+N_{PSCC\_CSIRS}$, where $N_{PSCC\_CSIRS}$ is '1' if the PSCC is configured with either both SSB and CSI-RS L3 MOs or only CSI-RS based L3 MO; otherwise, $N_{PSCC\_CSIRS}$ is '0.'

The $CSSF_{outside\_gap,i}$ for FR1 SCC may be used to determine the measurement period for measurements on the SCC(s) that are in FR1. This may be similar to that described above with respect to $CSSF_{outside\_gap,i}$ for FR2 SCC where neighbor cell measurement is not required. In particular, the UE may calculate the $CSSF_{outside\_gap,i}$ for FR1 SCC as $2\times(N_{SCC\_SSB}+Y+2\times N_{SCC\_CSIRS}-1-N_{SCC\_CSIRS\_NCM})$.

The $CSSF_{outside\_gap,i}$ for FR2 SCC where neighbor cell measurement is required may be determined based on whether condition A is true or false as discussed above. In particular, when condition A is true, the UE 104 may determine that the $CSSF_{outside\_gap,i}$ for FR2 SCC where neighbor cell measurement is required is $1+N_{SCC\_CSIRS\_FR2\_NCM}$; and when condition A is false, the UE 104 may determine that the $CSSF_{outside\_gap,i}$ for FR2 SCC where neighbor cell measurement is required is $2\times(1+N_{SCC\_CSIRS\_FR2\_NCM})$.

The $CSSF_{outside\_gap,i}$ for FR2 SCC where neighbor cell measurement is not required and $CSSF_{outside\_gap,i}$ for inter-frequency MOs with no measurement gap may be similar to like-named CSSFs discussed above with respect to scenario 1. For example, these CSSFs may be set to $2\times(N_{SCC\_SSB}+Y+2\times N_{SCC\_CSIRS}-1-N_{SCC\_CSIRS\_NCM})$.

FIG. 4 illustrates a table 400 describing CSSF calculations for two scenarios in SA mode in accordance with some embodiments. Thus, the base station 108 or the base station 112 may be a gNB to provide a PCell/PCC and one or more SCell(s)/SCC(s). This instance may not include a dual-connectivity connection. Table 400 may be similar to Table 9.1.5.1.2-1 of TS 38.133 with the exception of the CSSF calculations for the $CSSF_{outside\_gap,i}$ for FR2 SCC where neighbor cell measurement is required.

In the first scenario, the UE 104 may be configured for SA mode with FR2 only interband CA. For example, the NR component carriers (for example, the PCC and the SCC(s)) may be in different bands in FR2. The CSSFs that may be relevant to the first scenario may include $CSSF_{outside\_gap,i}$ for FR2 PCC, $CSSF_{outside\_gap,i}$ for FR2 SCC where neighbor cell measurement is required, $CSSF_{outside\_gap,i}$ for FR2 SCC where neighbor cell measurement is not required, and $CSSF_{outside\_gap,i}$ for inter-frequency MO with no measurement gap.

The $CSSF_{outside\_gap,i}$ for FR2 PCC may be used to determine the measurement period for measurements on the PCC that is in FR2. This CSSF may be '1' to provide the PCC with the entire first searcher.

The $CSSF_{outside\_gap,i}$ for FR2 SCC where neighbor cell measurement is required may be used and determined in a manner similar to that described above with respect to Table 300. For example, the $CSSF_{outside\_gap,i}$ for FR2 SCC where neighbor cell measurement is required may be determined based on whether condition A is true or false as discussed above. In particular, when condition A is true, the UE 104 may determine that the $CSSF_{outside\_gap,i}$ for FR2 SCC where neighbor cell measurement is required is $1+N_{SCC\_CSIRS\_FR2\_NCM}$; and when condition A is false, the UE 104 may determine that the $CSSF_{outside\_gap,i}$ for FR2 SCC where neighbor cell measurement is required is $2\times(1+N_{SCC\_CSIRS\_FR2\_NCM})$.

The $CSSF_{outside\_gap,i}$ for FR2 SCC where neighbor cell measurement is not required may be used and determined in a manner similar to that described above with respect to Table 300. For example, it may be set equal to $2\times(N_{SCC\_SSB}+Y+2\times N_{SCC\_CSIRS}-1-N_{SCC\_CSIRS\_NCM})$.

The $CSSF_{outside\_gap,i}$ for inter-frequency MOs with no measurement gap may be used and determined in a manner similar to that described above with respect to Table 300. For example, it may be set equal to $2\times(N_{SCC\_SSB}+Y+2\times N_{SCC\_CSIRS}-1-N_{SCC\_CSIRS\_NCM})$.

The second scenario covered by Table 400 for SA mode may include FR1 plus FR2 CA, with the PCell/PCC being in FR1 and one or more SCells/SCCs in FR1 or FR2. The CSSFs that may be relevant to the second scenario include $CSSF_{outside\_gap,i}$ for FR1 PCC, $CSSF_{outside\_gap,i}$ for FR1 SCC, $CSSF_{outside\_gap,i}$ for FR2 SCC where neighbor cell measurement is required, $CSSF_{outside\_gap,i}$ for FR2 SCC where neighbor cell measurement is not required, and $CSSF_{outside\_gap,i}$ for inter-frequency MO with no measurement gap.

The $CSSF_{outside\_gap,i}$ for FR1 PCC may be used to determine the measurement period for measurements on the PCC that is in FR1. The UE 104 may calculate the $CSSF_{outside\_gap,i}$ for FR1 PCC as $1+N_{PCC\_CSIRS}$, where $N_{PCC\_CSIRS}$ is '1' if the PCC is configured with either both SSB and CSI-RS L3 MOs or only CSI-RS based L3 MO; otherwise, $N_{PCC\_CSIRS}$ is '0.'

The $CSSF_{outside\_gap,i}$ for FR1 SCC may be used to determine the measurement period for measurements on the SCC(s) that are in FR1. This may be similar to that described above with respect to $CSSF_{outside\_gap,i}$ for FR1 SCC in the second scenario of Table 300. In particular, the UE 104 may calculate the $CSSF_{outside\_gap,i}$ for FR1 SCC as $2\times(N_{SCC\_SSB}+Y+2\times N_{SCC\_CSIRS}-1-N_{SCC\_CSIRS\_NCM})$.

The $CSSF_{outside\_gap,i}$ for FR2 SCC where neighbor cell measurement is required may be determined based on whether condition A is true or false as discussed above. In particular, when condition A is true, the UE 104 may determine that the $CSSF_{outside\_gap,i}$ for FR2 SCC where neighbor cell measurement is required is $1+N_{SCC\_CSIRS\_FR2\_NCM}$; and when condition A is false, the UE 104 may determine that the $CSSF_{outside\_gap,i}$ for FR2 SCC where neighbor cell measurement is required is $2\times(1+N_{SCC\_CSIRS\_FR2\_NCM})$.

The $CSSF_{outside\_gap,i}$ for FR2 SCC where neighbor cell measurement is not required and the $CSSF_{outside\_gap,i}$ for inter-frequency MOs with no measurement gap may be similar to like-named CSSFs discussed above with respect to the first scenario.

FIG. 5 illustrates a table 500 describing CSSF calculations for a scenario in NR-DC mode in accordance with some embodiments. Thus, the MN 108 is a gNB and the SN 112 is a gNB. Table 500 may be similar to Table 9.1.5.1.3-1 of TS 38.133 with the exception of the CSSF calculation for the $CSSF_{outside\_gap,i}$ for FR2 PSCC.

In this scenario, the UE 104 may be configured for NR-DC mode with FR1 and FR2 NR-DC, with the PCell in FR1 and the PSCell in FR2. The CSSFs that may be relevant to this scenario may include $CSSF_{outside\_gap,i}$ for FR1 PCC, $CSSF_{outside\_gap,i}$ for FR1 SCC, $CSSF_{outside\_gap,i}$ for FR2 PSCC, $CSSF_{outside\_gap,i}$ for FR2 SCC where neighbor cell measurement is not required, and $CSSF_{outside\_gap,i}$ for inter-frequency MO with no measurement gap.

The $CSSF_{outside\_gap,i}$ for FR1 PCC may be used to determine the measurement period for measurements on the PCC that is in FR1. The $CSSF_{outside\_gap,i}$ for FR1 PCC may be set equal to $1+N_{PCC\_CSIRS}$, where $N_{PCC\_CSIRS}$ is '1' if PCC is with either both SSB and CSI-RS based L3 MOs or only CSI-RS based L3 MO configured, otherwise $N_{PCC\_CSIRS}$ is '0.'

The $CSSF_{outside\_gap,i}$ for FR1 SCC may be used to determine the measurement period for measurements on SCells/SCCs on FR1. The UE 104 may set the $CSSF_{outside\_gap,i}$ for FR2 SCC set equal to $2\times(N_{SCC\_SSB}+Y+2\times N_{SCC\_CSIRS})$.

The $CSSF_{outside\_gap,i}$ for FR2 PSCC may be used to determine the measurement period for measurements on the PSCell/PSCC in FR2. The UE 104 may determine $CSSF_{outside\_gap,i}$ for FR2 PSCC based on whether a condition (condition B) is true or false. Condition B may be true when no FR2 SCell/SCC is configured with an MO and no inter-frequency MOs without measurement gap are configured. When condition B is true, the last two columns of table 500 may be not applicable and the PSCell/PCell may be provided with the entire second searcher (as there is no SCCs within the SCG to measure). When condition B is true, the UE 104 may determine that the $CSSF_{outside\_gap,i}$ for FR2 PSCC is $1+N_{PSCC\_CSIRS}$, where $N_{PSCC\_CSIRS}$ is '1' if PSCC is configured with either both SSB and CSI-RS based L3 MOs or only a CSI-RS based L3 MO configured; otherwise, $N_{PSCC\_CSIRS}$ is '0.'

The UE 104 may determine the condition B is false if one or more SCells/SCCs are configured with MO or an inter-frequency MO without measurement gap is configured. If condition B is false, the UE 104 may determine that the $CSSF_{outside\_gap,i}$ for FR2 PSCC is $2\times(1+N_{PSCC\_CSIRS})$. Thus, in this case, the PSCell/PSCC may share the second searcher with other MOs such as those corresponding to the last two columns of table 500.

The $CSSF_{outside\_gap,i}$ for FR2 SCC where neighbor cell measurement is not required and the $CSSF_{outside\_gap,i}$ for inter-frequency MOs with no measurement gap may be similar to like-named CSSFs discussed above with respect to the first scenario of Table 400.

FIG. 6 illustrates a table 600 describing CSSF calculations for two scenarios in NE-DC mode in accordance with some embodiments. Thus, the MN 108 is a gNB and the SN 112 is an eNB. Table 600 may be similar to Table 9.1.5.1.4-1 of TS 38.133 with the exception of the CSSF calculations for the $CSSF_{outside\_gap,i}$ for FR2 SCC where neighbor cell measurement is required.

In the first scenario, the UE 104 may be configured for NE-DC mode with FR2 only interband CA. For example, the NR component carriers (for example, the PCC and the SCC(s)) may be in different bands in FR2. The CSSFs that may be relevant to the first scenario may include $CSSF_{outside\_gap,i}$ for FR2 PCC, $CSSF_{outside\_gap,i}$ for FR2 SCC where neighbor cell measurement is required, $CSSF_{outside\_gap,i}$ for FR2 SCC where neighbor cell measurement is not required, and $CSSF_{outside\_gap,i}$ for inter-frequency MO with no measurement gap.

The $CSSF_{outside\_gap,i}$ for FR2 PCC may be used to determine the measurement period for measurements on the PCC that is in FR2. This CSSF may be $1+N_{PCC\_CSIRS}$.

The $CSSF_{outside\_gap,i}$ for FR2 SCC where neighbor cell measurement is required may be used and determined in a manner similar to that described above with respect to Table 300. For example, the $CSSF_{outside\_gap,i}$ for FR2 SCC where neighbor cell measurement is required may be determined based on whether condition A is true or false as discussed above. In particular, when condition A is true, the UE 104 may determine that the $CSSF_{outside\_gap,i}$ for FR2 SCC where neighbor cell measurement is required is $1+N_{SCC\_CSIRS\_FR2\_NCM}$; and when condition A is false, the UE 104 may determine that the $CSSF_{outside\_gap,i}$ for FR2 SCC where neighbor cell measurement is required is $2\times(1+N_{SCC\_CSIRS\_FR2\_NCM})$.

The $CSSF_{outside\_gap,i}$ for FR2 SCC where neighbor cell measurement is not required may be used and determined in a manner similar to that described above with respect to Table 300. For example, it may be set equal to $2\times(N_{SCC\_SSB}+Y+2\times N_{SCC\_CSIRS}-1-N_{SCC\_CSIRS\_NCM})$.

The $CSSF_{outside\_gap,i}$ for inter-frequency MOs with no measurement gap may be used and determined in a manner similar to that described above with respect to Table 300. For example, it may be set equal to $2\times(N_{SCC\_SSB}+Y+2\times N_{SCC\_CSIRS}-1-N_{SCC\_CSIRS\_NCM})$.

In the second scenario, the UE 104 may be configured for NE-DC mode with FR1 plus FR2 CA, with the PCell/PCC in FR1 and the NR SCells/SCCs in FR1 or FR2. The CSSFs that may be relevant to the second scenario may include $CSSF_{outside\_gap,i}$ for FR1 PCC, $CSSF_{outside\_gap,i}$ for FR1 SCC, $CSSF_{outside\_gap,i}$ for FR2 SCC where neighbor cell measurement is required, $CSSF_{outside\_gap,i}$ for FR2 SCC where neighbor cell measurement is not required, and $CSSF_{outside\_gap,i}$ for inter-frequency MO with no measurement gap.

The $CSSF_{outside\_gap,i}$ for FR1 PCC may be used to determine the measurement period for measurements on the PCC that is in FR1. This CSSF may be $1+N_{PCC\_CSIRS}$.

The $CSSF_{outside\_gap,i}$ for FR1 SCC may be used and determined in a manner similar to that described above with respect to Table 300. For example, it may be set to $2\times(N_{SCC\_SSB}+Y+2\times N_{SCC\_CSIRS}-1-N_{SCC\_CSIRS\_NCM})$.

The $CSSF_{outside\_gap,i}$ for FR2 SCC where neighbor cell measurement is required may be used and determined in a manner similar to that described above with respect to Table 300. For example, the $CSSF_{outside\_gap,i}$ for FR2 SCC where neighbor cell measurement is required may be determined based on whether condition A is true or false as discussed above. In particular, when condition A is true, the UE 104 may determine that the $CSSF_{outside\_gap,i}$ for FR2 SCC where neighbor cell measurement is required is $1+N_{SCC\_CSIRS\_FR2\_NCM}$; and when condition A is false, the UE 104 may determine that the $CSSF_{outside\_gap,i}$ for FR2 SCC where neighbor cell measurement is required is $2\times(1+N_{SCC\_CSIRS\_FR2\_NCM})$.

The $CSSF_{outside\_gap,i}$ for FR2 SCC where neighbor cell measurement is not required may be used and determined in a manner similar to that described above with respect to Table 300. For example, it may be set equal to $2\times(N_{SCC\_SSB}+Y+2\times N_{SCC\_CSIRS}-1-N_{SCC\_CSIRS\_NCM})$.

The $CSSF_{outside\_gap,i}$ for inter-frequency MOs with no measurement gap may be used and determined in a manner similar to that described above with respect to Table 300. For example, it may be set equal to $2\times(N_{SCC\_SSB}+Y+2\times N_{SCC\_CSIRS}-1-N_{SCC\_CSIRS\_NCM})$.

The embodiments described above with respect to tables 300-600 are generally directed to measurements performed with no measurement gaps. Other embodiments are related to measurements performed within measurement gaps and how the associated CSSF within measurement gaps are determined. For example, measurement objects may share the same searcher within a measurement gap, and the CSSF with measurement gap may be used to scale the measurement period for the MOs that are using the measurement gap. Embodiments describe modifications to the CSSF calculation to account for CSI-RS-based L3 measurements.

As described in clause 9.1.5.2 of 3GPP TS 38.133, the CSSF within measurement gap ($CSSF_{within\_gap,i}$) for a measurement object i may be applied to a specific set of measurement types. Thus, measurement activities of the specific set of measurement types may share the same searcher resource within the measurement gap. The measurement types listed in TS 38.133 include:

SSB-based intra-frequency measurement object with no measurement gap in clause 9.2.5, when all of the SMTC occasions of this intra-frequency measurement object are overlapped by the measurement gap.

SSB-based intra-frequency measurement object with measurement gap in clause 9.2.6.

CSI-RS based inter-frequency measurement in clause xxx, when CSI-RS resources for L3 measurement of this inter-frequency measurement object are overlapped by the measurement gap.

CSI-RS based inter-frequency measurement in clause xxx, when CSI-RS resources for L3 measurement of this inter-frequency measurement object are partially overlapped by the measurement gap.

SSB-based inter-frequency measurement object with measurement gap in clause 9.3.4.

Including inter-frequency measurement with no measurement gap, when all of the SMTC occasions of this inter-frequency measurement object are overlapped by the measurement gap, if UE supports interFrequencyMeas-NoGap-r16.

Including inter-frequency measurement with no measurement gap, when part of the SMTC occasions of this inter-frequency measurement object are overlapped by the measurement gap, if it is not a CA capable UE.

E-UTRA Inter-RAT measurement object in clauses 9.4.2 and 9.4.3.

NR PRS-based measurements for positioning in clause 9.9.

E-UTRA Inter-RAT RSTD and E-CID measurements in clauses 9.4.4 and 9.4.5.

NR Inter-RAT measurement object configured by the E-UTRAN PCell (TS 36.133 [v17.1.0 (2021-04-08)] clause 8.17.4).

E-UTRAN Inter-frequency measurement object configured by the E-UTRAN PCell (TS 36.133 . . . clause 8.17.3) and by the E-UTRAN PSCell (TS 36.133 . . . clause 8.19.3).

E-UTRAN Inter-frequency RSTD measurement configured by the E-UTRAN PCell (TS 36.133 . . . clause 8.17.15).

UTRA Inter-RAT measurement object configured by the E-UTRAN PCell (TS 36.133 . . . clauses 8.17.5 to 8.17.12).

GSM Inter-RAT measurements configured by the E-UTRAN PCell (TS 36.133 . . . clauses 8.17.13 and 8.17.14).

Embodiments of the present disclosure include two additional measurement types in the set of measurement types to which $CSSF_{witin\_gap,i}$ applies. These additional measurement types include: CSI-RS based intra-frequency measurement, when CSI-RS resources for L3 measurement of this intra-frequency measurement object are fully overlapped by the measurement gap; and CSI-RS based inter-frequency measurement with no measurement gap, when CSI-RS resources for L3 measurement of this inter-frequency measurement object are fully overlapped by the measurement gap.

Clause 9.10.2.1 of TS 38.133 defines a measurement as a CSI-RS based intra-frequency measurement if:

the [subcarrier spacing (SCS)] of the CSI-RS resource of the neighbour cell configured for measurement is the same as the SCS of the CSI-RS resource on the serving cell indicated for measurement, and the [cyclic prefix (CP)] type of the CSI-RS resource of neighbour cell configured for measurement is the same as the CP type of the CSI-RS resource of the serving cell indicated for measurement, and It is applied for SCS=60 KHz the centre frequency of the CSI-RS resource of the neighbour cell configured for measurement is the same as the centre frequency of the CSI-RS resource of the serving cell indicated for measurement.

Typically, no measure gaps are needed to perform CSI-RS based intra-frequency measurements; however, if the CSI-RS resources for L3 measurement are fully overlapped by the measurement gap, then the UE 104 has to do the measurement within the gap. Thus, this case will also share the measurement gap resources with other measurement objects.

A CSI-RS based measurement may be defined as a CSI-RS based inter-frequency measurement if it does not meet the conditions described above for intra-frequency measurement. In some instances, the UE 104 may be configured with a CSI-RS based inter-frequency measurement with no measurement gap. This may be done when, for example, the UE 104 has a spare RF chain to cover the inter-frequency measurement and not cause interruption to the current serving cell reception or the UE 104 has a currently active bandwidth part that contains the inter-frequency CSI-RS. Nevertheless, if the CSI-RS resources of this inter-frequency measurement is fully overlapped by the measurement gap, the UE 104 will need to do the measurement within the gap with other measurement objects.

Figure 7:
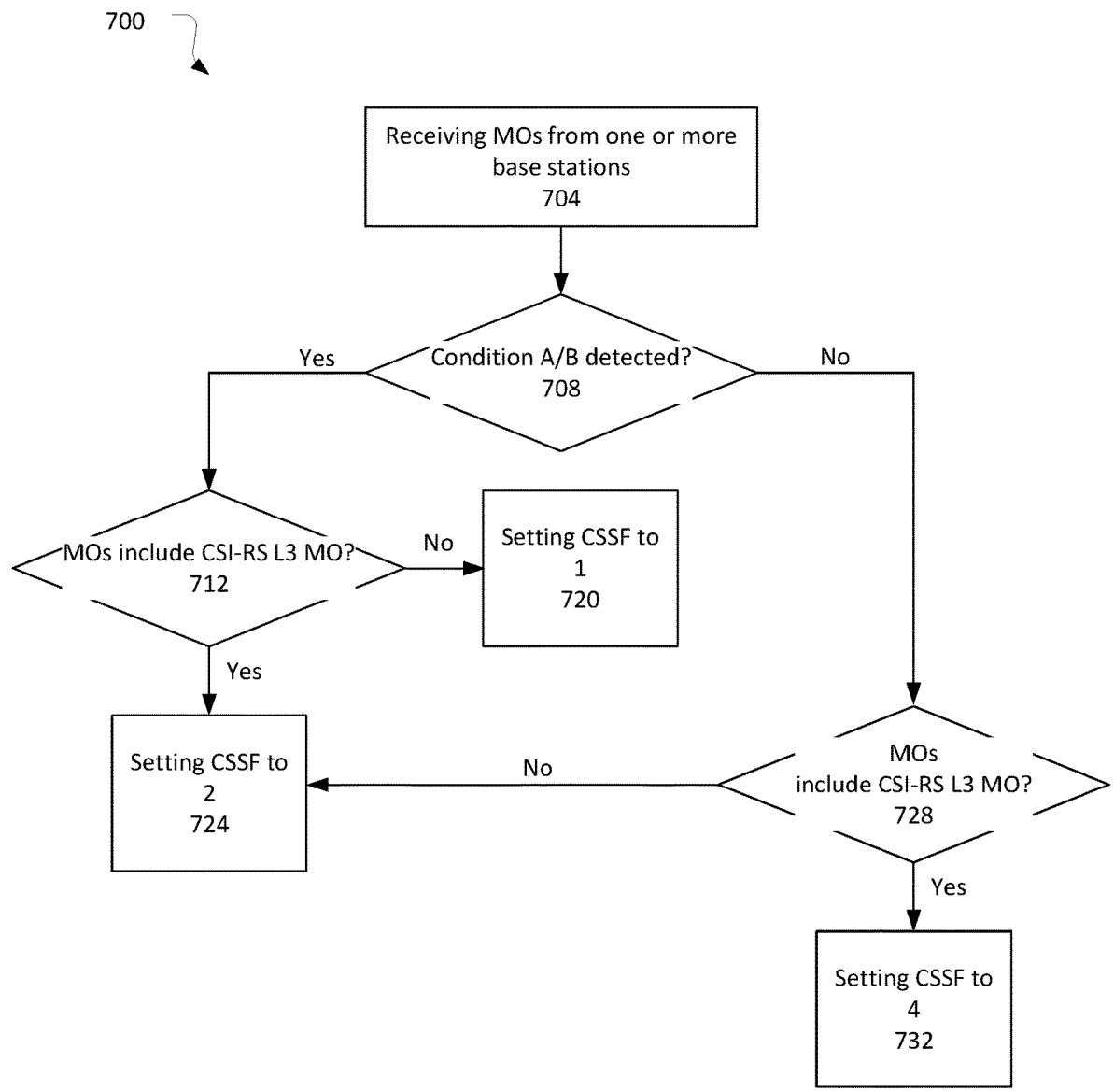
FIG. 7 illustrates an operational flow/algorithmic structure in accordance with some embodiments.

FIG. 7 illustrates an operation flow/algorithmic structure 700 in accordance with some embodiments. The operation flow/algorithmic structure 700 may be performed or implemented by a UE such as, for example, UE 104 or UE 1000; or components thereof, for example, baseband processor 1004A.

The operation flow/algorithmic structure 700 may include, at 704, receiving measurement objects (MOs) from one or more base stations. The MOs may configure measurements in a frequency range that are to be performed as part of a measurement procedure outside of a measurement gap. The frequency range may be FR2 or a higher range, for example, FRH. If the UE is in EN-DC mode, an SA mode, or an NE-DC mode, the one or more MOs may configure one or more measurements on an SCell/SCC in the frequency range. If the UE is in an NR-DC mode, the one or more MOs may configure one or more measurements on an PSCell/PSCC in the frequency range.

The operation flow/algorithmic structure 700 may further include, at 708, determining whether condition A or B are detected.

If the UE performing the operation flow/algorithmic structure 700 is connected with the network in an EN-DC mode, an SA mode, or an NE-DC mode, the UE may determine whether condition A is detected. Condition A may be that the MOs only configure measurements on the one SCell/SCC and do not include any inter-frequency MOs without measurement gap.

If the UE performing the operation flow/algorithmic structure 700 is connected with the network in an NR-DC mode, the UE may determine whether condition B is detected. Condition B may be that the MOs do not configure measurements on any SCell/SCC in the frequency range and do not include any inter-frequency MOs without measurement gap.

If it is determined that condition A/B is detected at 708, the operation flow/algorithmic structure 700 may advance to determining whether the MOs include a CSI-RS MO at 712. For example, the UE may determine whether the MOs configure L3 measurements based on a CSI-RS on the SCell/SCC (or PSCell/PSCC). This may correspond to $N_{SCC\_CSIRS\_FR2\_NCM}$ or $N_{PSCC\_CSIRS}$ discussed above with respect to FIGS. 3-6.

If it is determined, at 712, that the MOs do not include a CSI-RS MO (for example, $N_{SCC\_CSIRS\_FR2\_NCM}$ or $N_{PSCC\_CSIRS}$ equal zero), the operation flow/algorithmic structure 700 may advance to setting the CSSF for the SCC or the PSCC to one at 720 (from, for example, $1+N_{SCC\_CSIRS\_FR2\_NCM}$ or $N_{PSCC\_CSIRS}$).

If it is determined, at 712, that the MOs do include a CSI-RS MO (for example, $N_{SCC\_CSIRS\_FR2\_NCM}$ or $N_{PSCC\_CSIRS}$ equal one), the operation flow/algorithmic structure 700 may advance to setting the CSSF for the SCC or the PSCC to two at 724 (from, for example, $1+N_{SCC\_CSIRS\_FR2\_NCM}$ or $N_{PSCC\_CSIRS}$).

If it is determined, at 708, that condition A/B is not detected, the operation flow/algorithmic structure 700 may advance to determining whether the MOs include a CSI-RS MO at 728. This may be similar to block 712.

If it is determined, at 728, that the MOs do not include a CSI-RS MO (for example, $N_{SCC\_CSIRS\_FR2\_NCM}$ or $N_{PSCC\_CSIRS}$ equal zero), the operation flow/algorithmic structure 700 may advance to setting the CSSF for the SCC or the PSCC to two at 724 (from, for example, 2×(1+ $N_{SCC\_CSIRS\_FR2\_NCM}$ or $N_{PSCC\_CSIRS}$)).

If it is determined, at 728, that the MOs do include a CSI-RS MO (for example, $N_{SCC\_CSIRS\_FR2\_NCM}$ or $N_{PSCC\_CSIRS}$ equal one), the operation flow/algorithmic structure 700 may advance to setting the CSSF for the SCC or the PSCC to four at 732 (from, for example, 2×(1+ $N_{SCC\_CSIRS\_FR2\_NCM}$ or $N_{PSCC\_CSIRS}$)).

Figure 8:
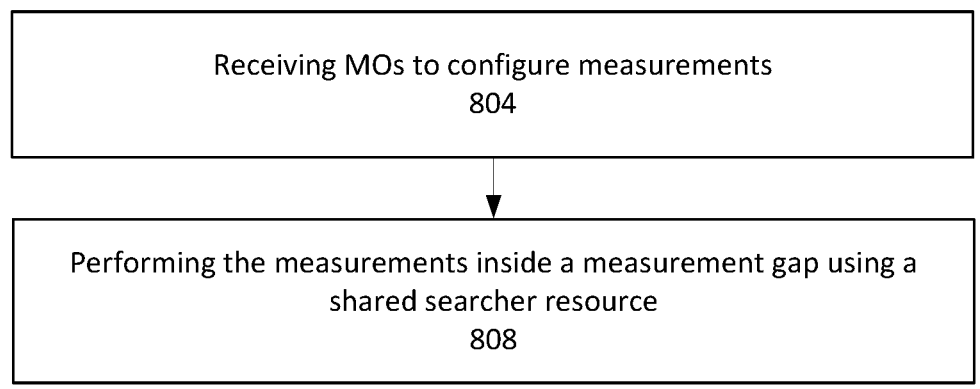
FIG. 8 illustrates another operational flow/algorithmic structure in accordance with some embodiments.

FIG. 8 illustrates an operation flow/algorithmic structure 800 in accordance with some embodiments. The operation flow/algorithmic structure 800 may be performed or implemented by a UE such as, for example, UE 104 or UE 1000; or components thereof, for example, baseband processor 1004A.

The operation flow/algorithmic structure 800 may include, at 804, receiving MOs from one or more base stations. The MOs may configure measurements on serving cells/component carriers in a frequency range (for example, FR2 or FRH) that are to be performed as part of a measurement procedure. The MOs may include an MO to configure a CSI-RS-based intra-frequency measurement or an MO to configure a CSI-RS-based inter-frequency measurement with no measurement gap.

The operation flow/algorithmic structure 800 may include, at 808, performing the measurements inside in measurement gap using a shared searcher resource. This may be done when the CSI-RS resources corresponding to the MOs that configure the CSI-RS-based intra-frequency or inter-frequency measurements are fully overlapped by the measurement gap. Thus, even though the MOs that configure the CSI-RS-based intra-frequency or inter-frequency measurements may not require the measurements to be performed in a measurement gap, when the resources fully overlap with the measurement gap, the searcher resources may need to be shared with the other measurements configured for the measurement gap.

Figure 9:
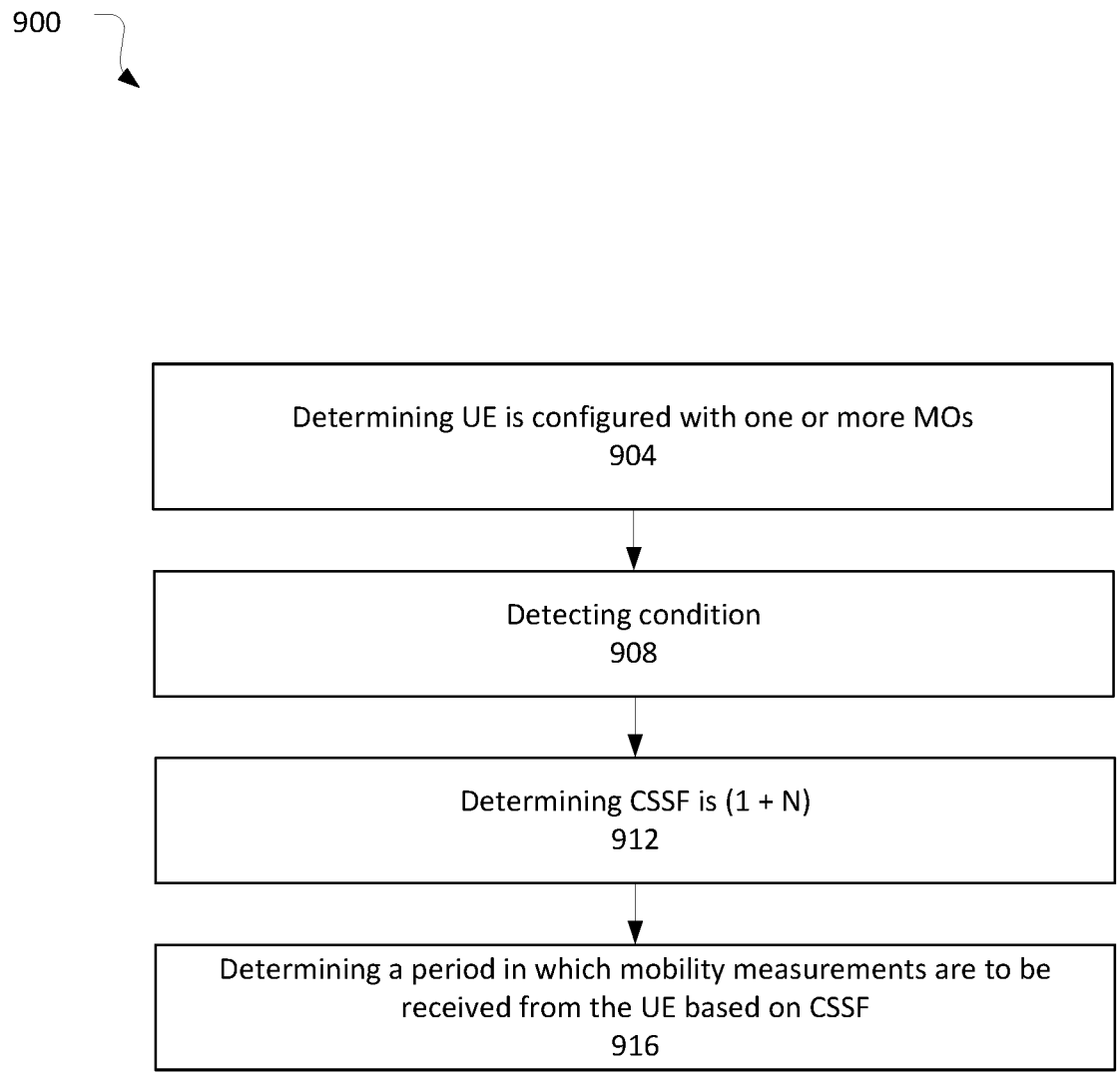
FIG. 9 illustrates another operational flow/algorithmic structure in accordance with some embodiments.

FIG. 9 illustrates an operation flow/algorithmic structure 900 in accordance with some embodiments. The operation flow/algorithmic structure 900 may be performed or implemented by a base station such as, for example, base station 108, 112, or 1100; or components thereof, for example, baseband processor 1104A.

The operation flow/algorithmic structure 900 may include, at 904, determining that a UE is configured with one or more measurement objects. The measurement object may configure measurements on an SCell/SCC or a PSCell/PSCC that are to be performed as part of a measurement procedure outside of a measurement gap.

The operation flow/algorithmic structure 900 may further include, at 908, detecting a condition based on a determination of a first number of SCCs in the frequency range and a second number of inter-frequency MOs without a measurement gap. If the UE is connected with the network in EN-DC, NE-DC, or SA mode, the measurement objects may configure measurements on an SCell/SCC and the condition may be detected if the first number is one and the second number is zero. If the UE is connected with the network in NR-DC mode, the measurement objects may configure measurements on a PSCell/PSCC and the condition may be detected if both the first number and the second number are zero.

The operation flow/algorithmic structure 900 may further include, at 912, determining that the CSSF is 1+N. In this embodiment, N may be one if the one or more MOs configure a CSI-RS based measurement, otherwise, N may be zero.

The operation flow/algorithmic structure 900 may further include, at 916, determining a period in which mobility measurements are to be received from the UE based on the CSSF. If the mobility measurements are received in the determined period, the base station may consider the measurements as valid measurements upon which mobility decisions may be based. If the mobility measurements are not received in the determined period, the base station may consider the measurements invalid measurements that are to be discarded.

Figure 10:
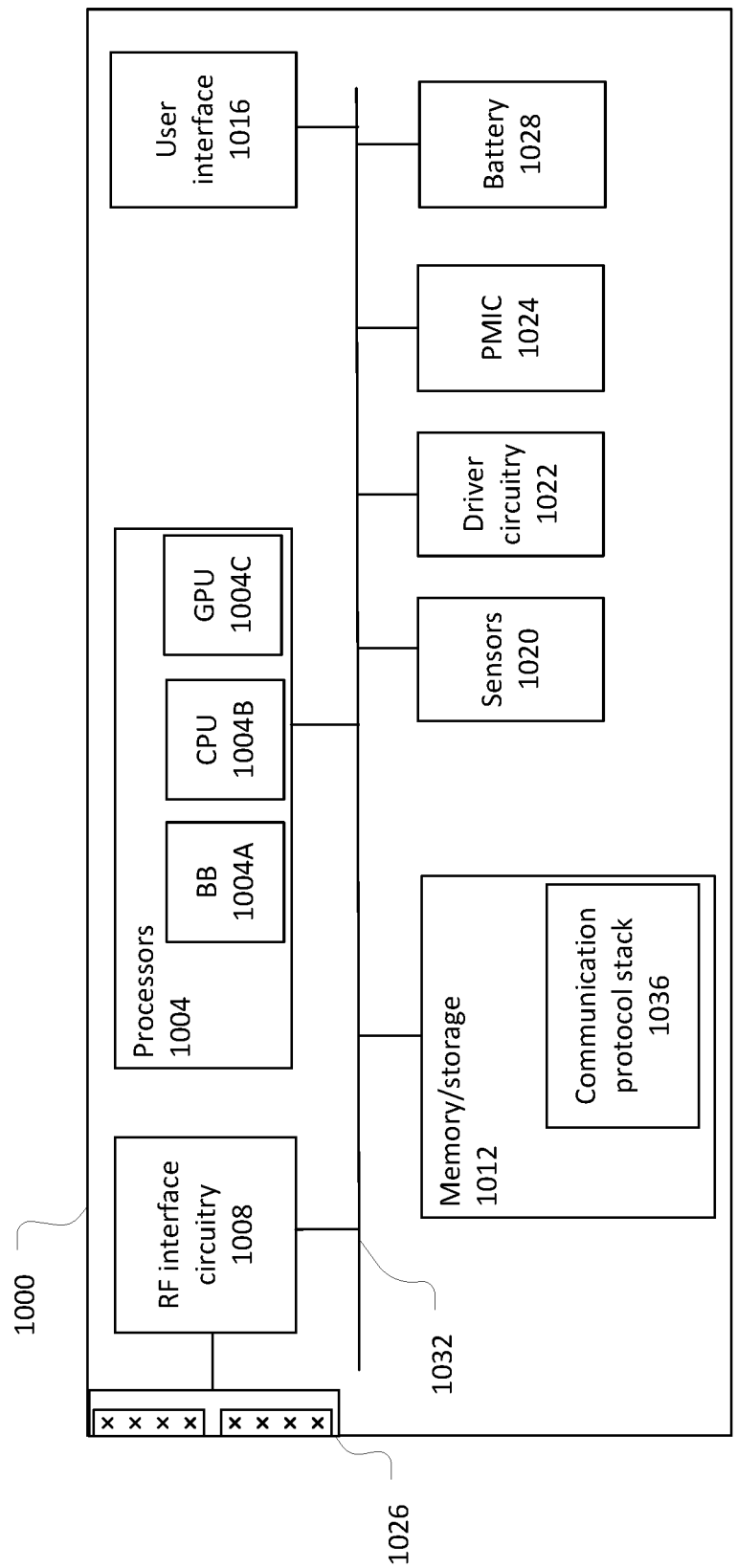
FIG. 10 illustrates a user equipment in accordance with some embodiments.

FIG. 10 illustrates a UE 1000 in accordance with some embodiments. The UE 1000 may be similar to and substantially interchangeable with UE 104 of FIG. 1.

The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras), wearable devices (for example, a smart watch), Internet of things (IoT) devices.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, or optical connection that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. Further, the memory/storage 1012 may include data/configuration information to facilitate the measurements and CSSF calculations described herein.

The memory/storage 1012 include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, or control circuitry.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, or phased array antennas. The antenna 1026 may have one or more panels designed for specific frequency bands including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, or headset. The output device circuitry includes any physical or virtual means for showing information or otherwise conveying information, such as sensor readings, actuator position (s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, or projectors), with the output of characters, graphics, or multimedia objects being generated or produced from the operation of the UE 1100.

The sensors 1020 may include devices, modules, or subsystems whose purpose is to detect events or changes in its environment and send the information (sensor data) about the detected events to some other device, module, or subsystem. Examples of such sensors include, for example, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector); depth sensors; ambient light sensors; ultrasonic transceivers; microphones or other like audio capture devices.

The driver circuitry 1022 may include software and hardware elements that operate to control particular devices that are embedded in the UE 1000, attached to the UE 1100, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000 including DRX as discussed herein.

A battery 1028 may power the UE 1000, although in some examples the UE 1000 may be mounted deployed in a fixed location, and may have a power supply coupled to an electrical grid. The battery 1028 may be a lithium ion battery or a metal-air battery (for example, a zinc-air battery, an aluminum-air battery, or a lithium-air battery). In some implementations, such as in vehicle-based applications, the battery 1028 may be a typical lead-acid automotive battery.

Figure 11:
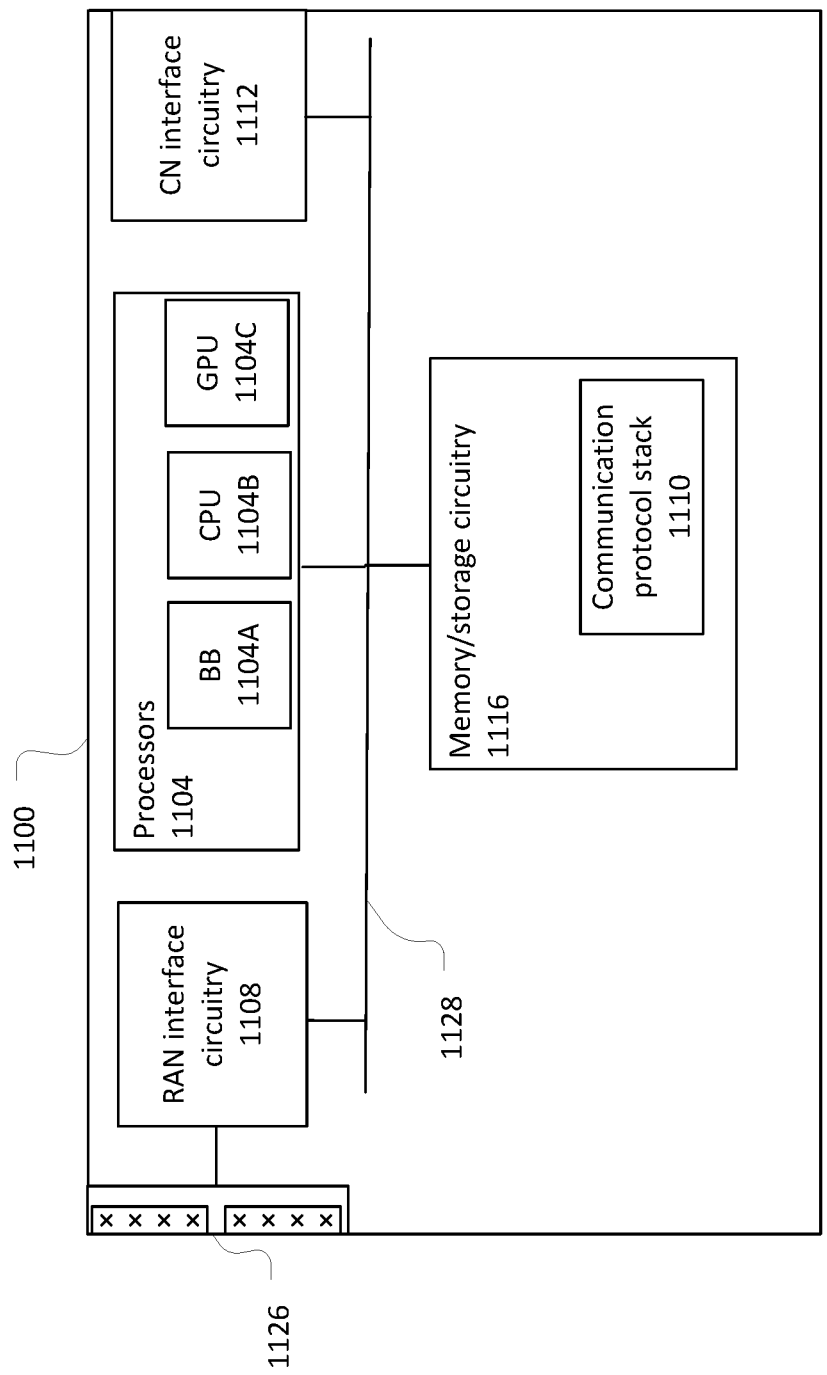
FIG. 11 illustrates a base station in accordance with some embodiments.

FIG. 11 illustrates a gNB 1100 in accordance with some embodiments. The gNB node 1100 may similar to and substantially interchangeable with base station 108 of FIG. 1.

The gNB 1100 may include processors 1104, RF interface circuitry 1108, core network "CN" interface circuitry 1112, memory/storage circuitry 1116, and antenna structure 1126.

The components of the gNB 1100 may be coupled with various other components over one or more interconnects 1128.

The processors 1104, RF interface circuitry 1108, memory/storage circuitry 1116 (including communication protocol stack 1110), antenna structure 1126, and interconnects 1128 may be similar to like-named elements shown and described with respect to FIG. 10.

The CN interface circuitry 1112 may provide connectivity to a core network, for example, a $5^{th}$ Generation Core network "5GC" using a 5GC-compatible network interface protocol such as carrier Ethernet protocols, or some other suitable protocol. Network connectivity may be provided to/from the gNB 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

In some embodiments, the gNB 1100 may be coupled with TRPs, such as TRPs 112 or 116, using the antenna structure 1126, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method of operating a user equipment (UE), the method comprising: receiving, from at least one base station, one or more measurement objects (MOs) to configure one or more measurements including at least one measurement on a secondary component carrier (SCC) in a frequency range, the one or more measurements configured to be performed as part of a measurement procedure outside of a measurement gap; detecting a condition based on a determination that the one or more MOs: do not configure measurements on SCCs in the frequency range other than the SCC for the measurement procedure; and do not include an inter-frequency MO without a measurement gap; determining that the one or more MOs configure a measurement on a channel state information—reference signal (CSI-RS); and determining a carrier specific scaling factor (CSSF) for the SCC is two based on detecting the condition and determining that the one or more MOs configure the measurement on the CSI-RS.

Example 2 includes the method of example 1, wherein the UE is connected with a network in an evolved universal terrestrial network—new radio—dual connectivity mode (EN-DC) mode with an evolved node B (eNB) as a master node and a next generation node B (gNB) as a secondary node (SN).

Example 3 includes the method of example 2, wherein the frequency range is frequency range 2 (FR2); the SCC is in a first frequency band of FR2; and a primary secondary component carrier (PSCC) is in a frequency range 1 (FR1) or in a second frequency band of FR2, wherein FR1 includes frequencies in a range from 410 megahertz (MHz) to 7,125 MHz and FR2 includes frequencies in a range from 24,250 megahertz (MHz) to 52,600 MHz.

Example 4 includes the method of example 1, wherein the UE is connected with a network in a standalone mode with the at least one base station comprising: a next generation node B (gNB).

Example 5 includes the method of example 4, wherein the frequency range is frequency range 2 (FR2); the SCC is in a first frequency band of FR2; and a primary component carrier (PCC) is in a second frequency band of FR2, wherein FR2 includes frequencies in a range from 24,250 megahertz (MHz) to 52,600 MHz.

Example 6 includes the method of example 4, wherein the frequency range is frequency range 2 (FR2); and a primary component carrier (PCC) is in frequency range 1 (FR1), wherein FR1 includes frequencies in a range from 410 megahertz (MHz) to 7,125 MHz and FR2 includes frequencies in a range from 24,250 megahertz (MHz) to 52,600 MHz.

Example 7 includes the method of example 1, wherein the UE is connected with a network in a new radio—evolved universal terrestrial access network—dual connectivity (NE-DC) mode with a next generation node B (gNB) as a master node (MN) and an evolved node B (eNB) as a secondary node (SN).

Example 8 includes the method of example 7, wherein the frequency range is frequency range 2 (FR2); the SCC is in a first frequency band of FR2; and a primary component carrier (PCC) is in a second frequency band of FR2, wherein FR2 includes frequencies in a range from 24,250 megahertz (MHz) to 52,600 MHz.

Example 9 includes the method of example 7, wherein the frequency range is frequency range 2 (FR2); and a primary component carrier (PCC) is in frequency range 1 (FR1), wherein FR1 includes frequencies in a range from 410 megahertz (MHz) to 7,125 MHz and FR2 includes frequencies in a range from 24,250 megahertz (MHz) to 52,600 MHz.

Example 10 includes the method of example 1, wherein the SCC is a full-capability secondary component carrier (SCC) that requires a neighbor cell measurement.

Example 11 includes the method of example 1, wherein the one or more MOs include a first MO to configure the measurement on the CSI-RS; or the one or more MOs include a first MO to configure the measurement on the CSI-RS and a second MO to configure a measurement on a synchronization signal and physical broadcast channel block (SSB).

Example 12 includes a method of operating a user equipment (UE), the method comprising: receiving, from at least one base station, one or more measurement objects (MOs) to configure one or more measurements including at least one measurement of a primary secondary component carrier (PSCC) in a frequency range, the one or more measurements configured to be performed as part of a measurement procedure outside of a measurement gap; detecting a condition based on a determination that the one or more MOs: do not configure measurements on any secondary component carriers (SCCs) in the frequency range for the measurement procedure; and do not include an inter-frequency MO without a measurement gap; determining that the one or more MOs configure a measurement on a channel state information—reference signal (CSI-RS); and determining a carrier specific scaling factor (CSSF) for the PSCC is two based on detecting the condition and determining that the one or more MOs configure the measurement on the CSI-RS.

Example 13 includes the method of example 12, wherein the UE is connected with a network in a new radio—dual connectivity (NR-DC) mode.

Example 14 includes the method of example 12, wherein the frequency range is frequency range 2 (FR2); and a primary component carrier (PCC) is in frequency range 1 (FR1), wherein FR1 includes frequencies in a range from 410 megahertz (MHz) to 7,125 MHz and FR2 includes frequencies in a range from 24,250 megahertz (MHz) to 52,600 MHz.

Example 15 includes the method of example 12, wherein the one or more MOs only include a first MO to configure the measurement on the CSI-RS; or the one or more MOs include a first MO to configure the measurement on the CSI-RS and a second MO to configure a measurement on a synchronization signal and physical broadcast channel block (SSB).

Example 16 includes a method of operating a UE, the method comprising: receiving, from one or more base stations, a plurality of measurement objects (MOs) to configure a plurality of measurements to be performed as part of a measurement procedure, the plurality of measurements to include a channel state information—reference signal (CSI-RS)-based intra-frequency measurement or a CSI-RS-based inter-frequency measurement with no measurement gap; and performing the plurality of measurements of the measurement procedure inside a measurement gap using a shared searcher resource.

Example 17 includes the method of example 16, wherein the plurality of measurements include a CSI-RS based intra-frequency measurement that is a layer 3 (L3) measurement on CSI-RS resources that are fully overlapped by the measurement gap.

Example 18 includes the method of example 16, wherein the plurality of measurements include a CSI-RS based inter-frequency measurement with no measurement gap that is a layer 3 (L3) measurement on CSI-RS resources that are fully overlapped by the measurement gap.

Example 19 includes the method of example 16, further comprising: calculating a carrier specific scaling factor (CSSF) for measurements within the measurement gap; and determining a period for performing the plurality of measurements.

Example 20 includes a method of operating a base station, the method comprising: determining a user equipment (UE) is configured with one or more measurement objects (MOs) that configure one or more measurements including at least one measurement on a secondary component carrier (SCC) or a primary secondary component carrier (PSCC) in a frequency range, the one or more measurements configured to be performed as part of a measurement procedure outside of a measurement gap; detecting a condition based on a determination of a number of SCCs in the frequency range for which the one or more MOs configure measurements for the measurement procedure and a number of inter-frequency MOs without a measurement gap for the measurement procedure; and determining, based on detecting the condition, a carrier specific scaling factor (CSSF) for the PSCC is (1+N), where N is one if the one or more MOs configure a measurement on a channel state information—reference signal (CSI-RS) and N is zero if the one or more MOs do not configure a measurement on CSI-RS.

Example 21 includes the method of example 20, further comprising: determining a period in which mobility measurements are to be received from the UE based on the CSSF.

Example 22 includes the method of example 20, wherein the at least one measurement is on an SCC and the UE is connected with a network in an evolved universal terrestrial network—new radio—dual connectivity mode (EN-DC) mode, a new radio-evolved universal terrestrial network (NE-DC) mode, or a standalone mode.

Example 23 includes the method of example 22, wherein the SCC is a full-capability SCC.

Example 24 includes the method of example 22, wherein the at least one measurement is on a PSCC and the UE is connected with a network in new radio—evolved universal terrestrial network—dual connectivity mode (NR-DC) mode with an evolved node B (eNB) as a secondary node (SN) and a next generation node B (gNB) as a master node (MN)

Example 25 may include an apparatus comprising means to perform one or more elements of a method described in or related to any of examples 1-24, or any other method or process described herein.

Example 26 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 27 may include an apparatus comprising logic, modules, or circuitry to perform one or more elements of a method described in or related to any of examples 1-24, or any other method or process described herein.

Example 28 may include a method, technique, or process as described in or related to any of examples 1-24, or portions or parts thereof.

Example 29 may include an apparatus comprising: one or more processors and one or more computer-readable media comprising instructions that, when executed by the one or more processors, cause the one or more processors to perform the method, techniques, or process as described in or related to any of examples 1-24, or portions thereof.

Example 30 may include a signal as described in or related to any of examples 1-24, or portions or parts thereof.

Example 31 may include a datagram, information element, packet, frame, segment, PDU, or message as described in or related to any of examples 1-24, or portions or parts thereof, or otherwise described in the present disclosure.

Example 32 may include a signal encoded with data as described in or related to any of examples 1-24, or portions or parts thereof, or otherwise described in the present disclosure.

Example 33 may include a signal encoded with a datagram, IE, packet, frame, segment, PDU, or message as described in or related to any of examples 1-24, or portions or parts thereof, or otherwise described in the present disclosure.

Example 34 may include an electromagnetic signal carrying computer-readable instructions, wherein execution of the computer-readable instructions by one or more processors is to cause the one or more processors to perform the method, techniques, or process as described in or related to any of examples 1-24, or portions thereof.

Example 35 may include a computer program comprising instructions, wherein execution of the program by a processing element is to cause the processing element to carry out the method, techniques, or process as described in or related to any of examples 1-24, or portions thereof.

Example 36 may include a signal in a wireless network as shown and described herein.

Example 37 may include a method of communicating in a wireless network as shown and described herein.

Example 38 may include a system for providing wireless communication as shown and described herein.

Example 39 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of comprising:
   receiving, from at least one base station, one or more measurement objects (MOs) to configure one or more measurements including at least one measurement on a secondary component carrier (SCC) in a frequency range, the one or more measurements configured to be performed as part of a measurement procedure outside of a measurement gap;
   detecting a condition based on a determination that the one or more MOs: do not configure measurements on SCCs in the frequency range other than the SCC for the measurement procedure; and do not include an inter-frequency MO without a measurement gap;
   determining that the one or more MOs configure a measurement on a channel state information—reference signal (CSI-RS); and
   determining a carrier specific scaling factor (CSSF) for the SCC is two based on detecting the condition and determining that the one or more MOs configure the measurement on the CSI-RS.

2. The method of claim 1, wherein the UE-method is associated with a user equipment (UE) that is connected with a network in an evolved universal terrestrial network— new radio—dual connectivity mode (EN-DC) mode with an evolved node B (eNB) as a master node and a next generation node B (gNB) as a secondary node (SN).

3. The method of claim 2, wherein the frequency range is frequency range 2 (FR2); the SCC is in a first frequency band of FR2; and a primary secondary component carrier (PSCC) is in a frequency range 1 (FR1) or in a second frequency band of FR2, wherein FR1 includes frequencies in a range from 410 megahertz (MHz) to 7,125 MHz and FR2 includes frequencies in a range from 24,250 megahertz (MHz) to 52,600 MHz.

4. The method of claim 1, wherein the method is associated with a user equipment (UE) that is connected with a network in a standalone mode with the at least one base station comprising: a next generation node B (gNB).

5. The method of claim 4, wherein the frequency range is frequency range 2 (FR2); the SCC is in a first frequency band of FR2; and a primary component carrier (PCC) is in a second frequency band of FR2, wherein FR2 includes frequencies in a range from 24,250 megahertz (MHz) to 52,600 MHz.

6. The method of claim 4, wherein the frequency range is frequency range 2 (FR2); and a primary component carrier (PCC) is in frequency range 1 (FR1), wherein FR1 includes frequencies in a range from 410 megahertz (MHz) to 7,125 MHz and FR2 includes frequencies in a range from 24,250 megahertz (MHz) to 52,600 MHz.

7. The method of claim 1, wherein the method is associated with a user equipment (UE) that is connected with a network in a new radio—evolved universal terrestrial access network—dual connectivity (NE-DC) mode with a next generation node B (gNB) as a master node (MN) and an evolved node B (eNB) as a secondary node (SN).

8. The method of claim 7, wherein the frequency range is frequency range 2 (FR2); the SCC is in a first frequency band of FR2; and a primary component carrier (PCC) is in a second frequency band of FR2, wherein FR2 includes frequencies in a range from 24,250 megahertz (MHz) to 52,600 MHz.

9. The method of claim 7, wherein the frequency range is frequency range 2 (FR2); and a primary component carrier (PCC) is in frequency range 1 (FR1), wherein FR1 includes frequencies in a range from 410 megahertz (MHz) to 7,125 MHz and FR2 includes frequencies in a range from 24,250 megahertz (MHz) to 52,600 MHz.

10. The method of claim 1, wherein the SCC is a full-capability secondary component carrier (SCC) that requires a neighbor cell measurement.

11. The method of claim 1, wherein the at least one measurement on the SCC comprise: only CSI-RS-based measurements; or the one or CSI-RS-based measurements and a synchronization signal and physical broadcast channel block (SSB)-based measurements.

12. An apparatus comprising:
    memory to store one or more measurement objects (MOs) that configure one or more measurements including at least one measurement of a primary secondary component carrier (PSCC) in a frequency range, the one or more measurements configured to be performed as part of a measurement procedure outside of a measurement gap; and
    processing circuitry coupled with the memory, the processing circuitry to:
    detect a condition based on a determination that the one or more MOs: do not configure measurements on any secondary component carriers (SCCs) in the frequency range for the measurement procedure; and do not include an inter-frequency MO without a measurement gap;

determine that the one or more MOs configure a measurement on a channel state information—reference signal (CSI-RS); and determine a carrier specific scaling factor (CSSF) for the PSCC is two based on detecting the condition and determining that the one or more MOs configure the measurement on the CSI-RS.

13. The apparatus of claim 12, wherein the processing circuitry is to determine the CSSF while the UB-apparatus is connected with a network in a new radio—dual connectivity (NR-DC) mode.

14. The apparatus of claim 12, wherein the frequency range is frequency range 2 (FR2); and a primary component carrier (PCC) is in frequency range 1 (FR1), wherein FR1 includes frequencies in a range from 410 megahertz (MHz) to 7,125 MHz and FR2 includes frequencies in a range from 24,250 megahertz (MHz) to 52,600 MHz.

15. The apparatus of claim 12, wherein the one or more MOs only include a first MO to configure the measurement on the CSI-RS; or the one or more MOs include a first MO to configure the measurement on the CSI-RS and a second MO to configure a measurement on a synchronization signal and physical broadcast channel block (SSB).

16. One or more non-transitory, computer-readable media having instructions that, when executed, cause processor circuitry to:

process one or more measurement objects (MOs) received from at least one base station, the one or more MOs to configure one or more measurements including at least one measurement on a secondary component carrier (SCC) in a frequency range, the one or more measurements configured to be performed as part of a measurement procedure outside of a measurement gap;

detect a condition based on a determination that the one or more MOs: do not configure measurements on SCCs in the frequency range other than the SCC for the measurement procedure; and do not include an inter-frequency MO without a measurement gap;

determine that the one or more MOs configure a measurement on a channel state information—reference signal (CSI-RS); and determine a carrier specific scaling factor (CSSF) for the SCC is two based on detection of the condition and determination that the one or more MOs configure the measurement on the CSI-RS.

17. The one or more non-transitory, computer-readable media of claim 16, wherein the one or more non-transitory, computer-readable media is associated with a user equipment (UE) that is connected with a network in a standalone mode with the at least one base station comprising: a next generation node B (gNB).

18. The one or more non-transitory, computer-readable media of claim 17, wherein the frequency range is frequency range 2 (FR2); the SCC is in a first frequency band of FR2; and a primary component carrier (PCC) is in a second frequency band of FR2, wherein FR2 includes frequencies in a range from 24,250 megahertz (MHz) to 52,600 MHz.

19. The one or more non-transitory, computer-readable media of claim 17, wherein the frequency range is frequency range 2 (FR2); and a primary component carrier (PCC) is in frequency range 1 (FR1), wherein FR1 includes frequencies in a range from 410 megahertz (MHz) to 7,125 MHz and FR2 includes frequencies in a range from 24,250 megahertz (MHz) to 52,600 MHz.

20. The one or more non-transitory, computer-readable media of claim 16, wherein the at least one measurement on the SCC comprise: only CSI-RS based measurements; or CSI-RS-based measurements and synchronization signal and physical broadcast channel block (SSB)-based measurements.

* * * * *